Feb. 3, 1931.  S. G. MALBY  1,791,035

METHOD OF MAKING PLUGS

Filed Sept. 11, 1929

INVENTOR
ATTORNEY

Patented Feb. 3, 1931

1,791,035

UNITED STATES PATENT OFFICE

SETH G. MALBY, OF TENAFLY, NEW JERSEY, ASSIGNOR TO ALUMINUM SCREW MACHINE PRODUCTS COMPANY, OF EDGEWATER, NEW JERSEY, A CORPORATION OF NEW JERSEY

METHOD OF MAKING PLUGS

Application filed September 11, 1929. Serial No. 391,772.

This invention relates to a method of making plugs and more particularly to a method of producing plugs having shanks, the diameters of which are within close tolerances. The plugs formed by the method herein described are known in the art as piston-pin plugs. They are inserted in the ends of wrist pins to take up wear which formerly caused a great deal of trouble and inconvenience. These plugs, when made of suitable soft metal such as aluminum alloy, take up the looseness and eliminate the noise caused by overheating and wear of the wrist pins.

Prior to this invention these plugs were made by turning the plug from a rod of any suitable metal, such as aluminum alloy, on an automatic turning machine, the diameter of the shank being slightly oversize. The plug and especially the shank portion thereof was then ground to the desired diameter on a centerless grinder. This method was satisfactory to a certain degree.

I have found that I can produce plugs more economically and form them much more uniformly and of superior finish than those produced as above described by turning in an automatic screw machine or lathe a bar or rod of any suitable metal, such as aluminum alloy, and thereby forming the desired headed plug, the shank of which is slightly undersize in diameter, upsetting the shank in any suitable manner whereby its diameter is made slightly oversize, and finally sizing said shank within close tolerances.

It is therefore an object of this invention to provide an economical method of producing plugs.

Another object of this invention is to provide a method of producing plugs sized to within close tolerances and having a substantially uniform finish free from machine tool marks and other irregularities.

Other objects will appear from the following description, appended claims and accompanying drawings in which:

Figure 1 designates a side elevation of a plug produced by the method constituting this invention.

Figure 1:
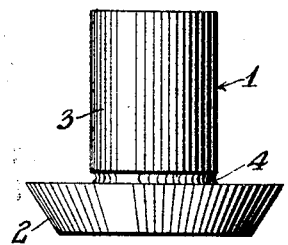
Figure 2:
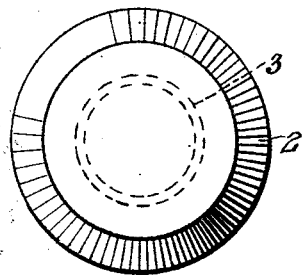
Figure 2 is a top plan view of the plug illustrated in Figure 1.

In carrying out the method comprising this invention, the first step is the production of the desired plug, the shank of which is slightly undersize in diameter. In this operation a definite shoulder is formed at the junction of the shank end head providing a tool clearance to ensure against the formation of a fillet in the succeeding operation. The shank of the plug is then upset, whereby it is made slightly greater in diameter than that desired. Finally, the shank is sized to within close tolerances of the diameter.

The first operation is carried out in an automatic screw machine or lathe whereby the plug 1, having the desired head 2 and the cylindrical shank 3 having an undersize diameter, is formed. Though the head 2 is illustrated in the drawings as being frusto-conical in shape, the invention is not restricted thereto. The head may be made of any desired shape. In this turning operation there is formed at the junction of said shank and head a tool clearance 4 which also ensures against the formation of a fillet in the operations hereinafter described. The shank 3 is then upset, whereby its diameter is increased in size and preferably slightly larger than required in the finished product. I have found that, if it is upset in a die, on a press or by a hammer, satisfactory results may be obtained. This upsetting step improves the surface. It substantially removes the machine tool irregularities and produces a shank more uniform than that obtained from the lathe.

Figure 3:
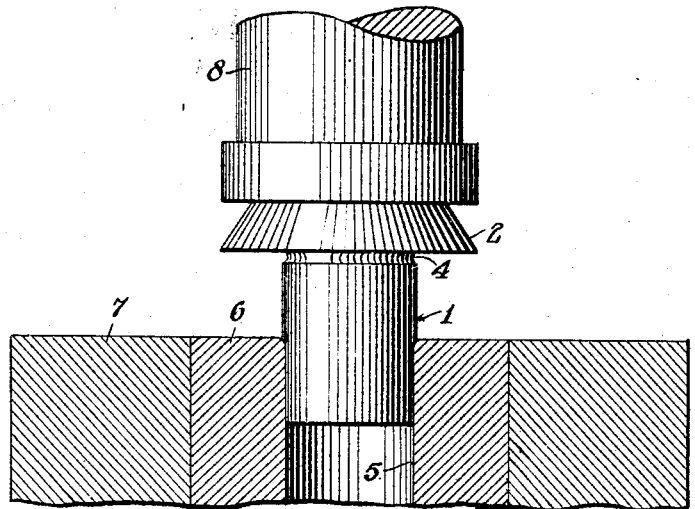
Figure 3 is a diagrammatic illustration of the final step of the process constituting this invention.

As is apparent at this stage of the operation, the shank 3 of the plug has a diameter slightly greater than required. It is therefore necessary to reduce the diameter to substantially that required. Due to its intended use the diameter of the shank of the plug must be extremely accurate within close tolerances and uniform. To attain these features the plug, and especially the shank thereof, is forced in a die cavity 5 of the die 6 mounted in the well-known manner in a die block 7, the die cavity having a diameter equal to that required in the finished product. As evident from Figure 3, the free end of the shank is positioned at the entrance of the die cavity, pressure being exerted on the head by means of a plunger 8. The excess metal in the shank is compressed and slightly elongated. This sizes the shank to within close tolerances and produces a surface finish which is superior to that obtained by a straight lathe machine and grinding operation.

From the above it is apparent that I have provided a method of producing plugs which is economical and produces plugs having a superior surface finish, the shanks thereof being sized within close tolerances. The above-described method may be applied to plugs of any type provided, of course, that the shanks thereof are of uniform cross-section. Since changes in the specific details above described will readily suggest themselves to persons skilled in the art, I do not limit myself thereto except as set forth in the appended claims.

I claim:

1. A method of making plugs which comprises turning a metallic rod to form a headed plug, said plug having its shank undersize in diameter, removing the machine irregularities on the surface of said shank, and sizing said shank.

2. A method of making plugs which comprises forming a plug, the shank thereof being undersize in diameter, oversizing the diameter of said shank, and finally sizing the diameter of said shank to the desired size.

3. A method of making plugs which comprises forming a plug, the shank thereof being undersize in diameter, upsetting the shank whereby the diameter thereof is made oversize, and finally sizing the diameter to the desired size.

4. A method of making plugs which comprises turning a rod of metal to form a headed plug having a shank undersize in diameter, upsetting said shank whereby its diameter is oversized, and finally die pressing said shank whereby its diameter is reduced to the desired size within close tolerances.

In testimony whereof, I have affixed my signature to this specification.

SETH G. MALBY.